(12) United States Patent
Wang et al.

(10) Patent No.: US 10,276,861 B2
(45) Date of Patent: Apr. 30, 2019

(54) COMPOSITION FOR LITHIUM ION BATTERY ELECTRODES

(71) Applicant: Dow Global Technologies LLC, Midland, MI (US)

(72) Inventors: Zhuo Wang, Shanghai (CN); Xiu Qin Shi, Shanghai (CN); Kun Chen, Shanghai (CN); Yingjun Cai, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 43 days.

(21) Appl. No.: 15/310,824

(22) PCT Filed: May 19, 2014

(86) PCT No.: PCT/CN2014/077759
§ 371 (c)(1),
(2) Date: Nov. 14, 2016

(87) PCT Pub. No.: WO2015/176201
PCT Pub. Date: Nov. 26, 2015

(65) Prior Publication Data
US 2017/0084911 A1    Mar. 23, 2017

(51) Int. Cl.
| | |
|---|---|
| *H01B 1/20* | (2006.01) |
| *H01M 4/62* | (2006.01) |
| *B05D 5/12* | (2006.01) |
| *H01M 4/36* | (2006.01) |
| *H01M 4/04* | (2006.01) |
| *H01M 4/139* | (2010.01) |
| *H01M 4/66* | (2006.01) |
| *H01M 10/0525* | (2010.01) |
| *C08L 33/06* | (2006.01) |
| *H01M 10/052* | (2010.01) |
| *H01M 4/02* | (2006.01) |

(52) U.S. Cl.
CPC ............. *H01M 4/364* (2013.01); *C08L 33/06* (2013.01); *H01B 1/20* (2013.01); *H01M 4/0404* (2013.01); *H01M 4/0471* (2013.01); *H01M 4/139* (2013.01); *H01M 4/622* (2013.01); *H01M 4/624* (2013.01); *H01M 4/661* (2013.01); *H01M 10/0525* (2013.01); *H01M 10/052* (2013.01); *H01M 2004/028* (2013.01)

(58) Field of Classification Search
CPC .. H01B 1/00; H01B 1/14; H01B 1/20; H01M 4/62; H01M 4/621; H01M 4/622; B05D 5/12
See application file for complete search history.

(56) References Cited

U.S. PATENT DOCUMENTS

| | | | |
|---|---|---|---|
| 8,877,375 B2 | 11/2014 | Kim et al. | |
| 2007/0264568 A1 | 11/2007 | Ryu et al. | |
| 2008/0131776 A1 | 6/2008 | Sakuma et al. | |
| 2008/0166633 A1 | 7/2008 | Hwang et al. | |
| 2012/0231337 A1* | 9/2012 | Miyata | C08J 3/05 429/217 |
| 2013/0177812 A1 | 7/2013 | Han et al. | |
| 2013/0209882 A1 | 8/2013 | Kim et al. | |
| 2013/0330621 A1 | 12/2013 | Narumi et al. | |

FOREIGN PATENT DOCUMENTS

| | | |
|---|---|---|
| CN | 101260282 A | 9/2008 |
| JP | H07226205 A | 8/1995 |
| JP | 2010-080297 A | 4/2010 |
| JP | 2011-065929 A | 3/2011 |

OTHER PUBLICATIONS

Chen, "Recent Progress in Advanced Materials for Lithium Ion Batteries", Materials, vol. 6, pp. 156-183 (2013).
Fergus, "Recent developments in cathode materials for lithium ion batteries", J. Power Sources, vol. 195, pp. 939-954 (2010).
Targray, "Introducing the Hydrophilic Binder (Modified Styrene-Butadiene Copolymer", Targray White Paper Aqueous Binder Rev. H., pp. 1-5 (2011).
Li, et al., "Effects of PAA-NH4 Addition on the Dispersion Property of Aqueous LiCoO2 Slurries and the Cell Performance of As-Prepared LiCoO2 Cathodes", Electrochemical and Solid-State Letters, vol. 8, issue 10, pp. A509-A512 (2005).

\* cited by examiner

*Primary Examiner* — Mark Kopec
(74) *Attorney, Agent, or Firm* — Ballard Spahr LLP

(57) ABSTRACT

An aqueous composition for making lithium ion battery electrodes comprising (a) one or more polymers, (b) one or more polyvinyl alcohols, and (c) one or more water-soluble cellulose derivatives. Also, a method of making an electrode comprising (i) providing an aqueous slurry comprising (a) one or more polymers, (b) one or more polyvinyl alcohols, (c) one or more water-soluble cellulose derivatives, and (d) one or more conductive material; (ii) forming a layer of said slurry on a metal substrate; and (iii) drying said layer of said slurry. Also, an electrode comprising ingredients (a) through (d).

11 Claims, No Drawings

COMPOSITION FOR LITHIUM ION BATTERY ELECTRODES

The lithium ion battery (LIB) is a rechargeable battery that is widely used for a variety of purposes, including consumer electronics and vehicles. In the past, the electrodes in LIBs were often made by distributing electrode material as particles in a liquid that also contained dissolved or dispersed polymeric binder. When a layer of the liquid was applied to a substrate and the liquid removed by evaporation, a layer of the desired electrode remained. One commonly-used polymeric binder was polyvinylidene fluoride (PVDF) dissolved in N-methyl-2-pyrrolidone (NMP) solvent. The PVDF binder has several disadvantages. The use of NMP poses environmental difficulties, and the relative humidity must be carefully controlled during the fabrication process. In the past, a waterborne binder that has been used is styrene/butadiene copolymer (SBR), dispersed as latex particles in water, where the water also contains dissolved sodium carboxymethyl cellulose (CMC). The SBR binder also has disadvantages. SBR binders have undesirably low stability in high voltage environments, and SBR binders do not show sufficient adhesion to aluminum substrate. Thus, when the SBR binder is applied to an aluminum foil and then the foil is bent, the binder tends to show one or more of the following problems: loss of adhesion to the aluminum; cracking; and powder dropping.

US 2008/0166633 describes an anode for a lithium battery made using a binder that contains a waterborne acrylic polymer and a water-soluble polymer. It is desired to provide an aqueous binder for lithium ion battery electrodes that is suitable for making cathodes and that shows, after application of the binder to an aluminum substrate and the bending of the substrate, one or more of the following: good adhesion to the aluminum; resistance to cracking, resistance to powder dropping. It is also desired that when cathodes are made using such an aqueous binder, that the cathodes show acceptable electrochemical performance, such as cycling stability and capacity retention.

The following is a statement of the invention.

The first aspect of the present invention is an aqueous composition for making lithium ion battery electrodes, said composition comprising
  (a) one or more binder polymers in the form of latex particles, wherein the latex particles have a volume-average diameter of 200 nm or smaller,
  (b) one or more polyvinyl alcohols, and
  (c) one or more water-soluble cellulose derivatives.

The second aspect of the present invention is a method of making an electrode suitable for use in a lithium ion battery, wherein said method comprises
  (i) providing an aqueous slurry comprising
    (a) one or more binder polymers in the form of latex particles, wherein the latex particles have a volume-average diameter of 200 nm or smaller,
    (b) one or more polyvinyl alcohols,
    (c) one or more water-soluble cellulose derivatives, and
    (d) one or more conductive material;
  (ii) forming a layer of said slurry on a metal substrate; and
  (iii) drying said layer of said slurry.

The third aspect of the present invention is a method of making a cathode suitable for use in a lithium ion battery, wherein said method comprises
  (i) providing an aqueous slurry comprising
    (a) one or more binder polymers in the form of latex particles, wherein the latex particles have a volume-average diameter of 200 nm or smaller,
    (b) one or more polyvinyl alcohols,
    (c) one or more water-soluble cellulose derivatives,
    (d) one or more conductive material, and
    (e) one or more cathode compounds that comprise lithium.
  (ii) forming a layer of said slurry on a metal substrate; and
  (iii) drying said layer of said slurry.

The fourth aspect of the present invention is the method of the second aspect, wherein said electrode is an anode, and wherein said slurry comprises one or more anode compounds, wherein each of said one or more anode compounds may be the same as one or more of said conductive materials or may be different from any of said conductive materials.

The fifth aspect of the present invention is an electrode suitable for use in a lithium ion battery, wherein said electrode comprises
  (a) one or more binder polymers,
  (b) one or more polyvinyl alcohols,
  (c) one or more water-soluble cellulose derivatives, and
  (d) one or more conductive material.

The sixth aspect of the present invention is a cathode suitable for use in a lithium ion battery, wherein said cathode comprises
  (a) one or more binder polymers,
  (b) one or more polyvinyl alcohols,
  (c) one or more water-soluble cellulose derivatives,
  (d) one or more conductive material, and
  (e) one or more cathode compounds that comprise lithium.

The seventh aspect of the present invention is the electrode of the fifth aspect, wherein the electrode comprises one or more anode compounds, wherein each of said one or more anode compounds may be the same as one or more of said conductive materials or may be different from any of said conductive materials.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

As used herein "weight of polymer" means the dry weight of polymer.

Molecules that can react with each other to form the repeat units of a polymer are known herein as "monomers." The repeat units so formed are known herein as "polymerized units" of the monomer.

Vinyl monomers have the structure

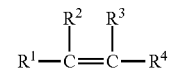

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof.

Vinyl monomers include, for example, styrene, substituted styrenes, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. Substituted monomers include, for example, monomers with more than one carbon-carbon double bond, monomers with hydroxyl groups, monomers with other functional groups, and monomers with combinations of functional groups. (Meth)acrylates are substituted and unsubstituted esters or amides of (meth)acrylic acid.

As used herein, acrylic monomers are monomers selected from (meth)acrylic acid, aliphatic esters of (meth)acrylic acid, aliphatic esters of (meth)acrylic acid having one or more substituent on the aliphatic group, (meth)acrylamide, N-substituted (meth)acrylamide, and mixtures thereof. As used herein, an "acrylic" polymer is a polymer in which 30% or more of the polymerized units are selected from acrylic monomers. The percentages are by weight based on the weight of the polymer.

As used herein, a "binder polymer" is a polymer having glass transition temperature (Tg) of 50° C. or lower. The category of binder polymers, as used herein, does not include polyvinyl alcohol, derivatives of polyvinyl alcohol, cellulose, or derivatives of cellulose. Tg is measured by Differential Scanning calorimetry at 10° C. per minute using the midpoint method.

Polyvinyl alcohol (PVA) is a polymer having a hydrocarbon backbone with various pendant groups. PVA is normally made by polymerization of vinyl acetate to form polyvinylacetate, followed by conversion some of the pendant acetate ester groups to hydroxyl groups. Some types of PVA are further modified by attaching functional groups such as, for example, carboxyl groups, sulfonate groups, or combinations thereof. PVA having pendant carboxyl groups is known herein as carboxylated PVA, and PVA having pendant sulfonate groups is known herein as sulfonated PVA.

PVA may be characterized by the degree of saponification. The degree of saponification is the molar percentage of the polymerized units of vinyl acetate that have been converted to hydroxyl groups. Optionally, some of those hydroxyl groups were later converted to other groups such as carboxyl and/or sulfonate groups.

PVA may also be characterized by the viscosity as follows. A solution of PVA in water is prepared at concentration of 4% by weight based on the weight of the solution, and the viscosity is measured at 20° C.

Cellulose is a naturally occurring organic polymer consisting of linear chain of linked D-glucose units. Cellulose is often reacted with one or more of various reagents to produce various derivatives. One useful class of useful cellulose derivatives is the class of water-soluble cellulose derivatives, which are compounds that are soluble in water at 25° C. in the amount of 1 gram or more per 100 grams of water.

Carboxymethyl cellulose (CMC) is a derivative of cellulose in which, on some or all of the pendant hydroxyl groups, the hydrogen atom is replaced by the carboxymethyl group, which is

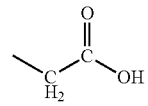

One characteristic of CMC is the degree of substitution, which is the average number of OH groups that have been substituted in one anhydroglucose unit. The degree of substitution is determined according to ASTM D 1439-03 "Standard Test Methods for Sodium Carboxymethylcellulose; Degree of Etherification, Test Method B: Nonaqueous Titration" (American Society for Testing and Materials, Conshohocken, Pa., USA).

A characteristic of water soluble cellulose derivatives is the viscosity, which is measured as follows. A 0.5~2% solution (by dry weight of water-soluble cellulose derivative, based on the weight of the solution) in water is prepared and tested using a Brookfield LVT, SP viscometer at 30 rpm at 25° C.

The term carboxymethyl cellulose (CMC) is considered to include both the neutral form of the compound and forms in which some or all of the carboxyl groups are in the anionic form.

An aqueous composition is a composition that contains 30% or more water, by weight based on the weight of the composition. Also, an aqueous composition is liquid at 25° C. Further, in an aqueous composition, there is a continuous liquid medium in which other materials are dispersed, and the the continuous liquid medium contains 50% or more water, by weight based on the weight of the continuous liquid medium. Substances dissolved in the water are considered to be part of the continuous liquid medium.

Latex particles are particles of polymer that are suspended in water.

The solids content of an aqueous composition is the material remaining when the water and any other compounds having boiling point of 100° C. or less have been removed from the aqueous composition.

An electrode in an electrochemical cell is either the anode or the cathode of the electrochemical cell.

Cathode compounds are typically oxides of transition metals, which can undergo oxidation to higher valences when lithium is removed.

As used herein, a material suitable for use as a cathode in a lithium ion battery contains one or more cathode compound and is capable of transferring electrons to a conductor and transferring lithium ions to an electrolyte.

Anode compounds are solid compounds that are capable of undergoing an insertion reaction in which a lithium cation and an electron, possibly in combination with each other, become inserted into the solid structure of the anode compound.

As used herein, a material suitable for use as an anode in a lithium ion battery contains one or more anode compound and is capable of transferring electrons to a conductor and transferring lithium ions to an electrolyte.

The anode compound, in the form that contains lithium, has a lower electrochemical potential than the cathode compound in the form that contains lithium. That is, if V1 is the absolute magnitude of the difference between the electrochemical potential of the anode compound in the form that contains lithium and the electrochemical potential of lithium metal, and V2 is the absolute magnitude of the difference between the electrochemical potential of the cathode compound in the form that contains lithium and the electrochemical potential of lithium metal, then V2 is larger than V1.

It is useful to consider herein the combination (herein called the "binder combination") of all the binder polymers in the composition, all the polyvinyl alcohols in the composition, and all of the water-soluble cellulose derivatives in the composition. The binder combination may be the only ingredients other than water in an aqueous composition, or the binder combination may be present in an aqueous composition that contains other ingredients in addition to water and the binder combination.

Preferred binder polymers are polyolefins, polydienes, polystyrenes, polyamides, polyesters, acrylic polymers, polyurethanes, copolymers thereof, and mixtures thereof. More preferred are acrylic polymers and polyurethanes; more preferred are acrylic polymers.

Binder polymers have Tg of 50° C. or lower; more preferred is Tg of 30° C. or lower; more preferred is 10° C. or lower; more preferred is 0° C. or lower.

Preferred acrylic polymers have polymerized units of acrylic monomers in the amount, by weight based on the dry weight of the polymer, of 50% or more; more preferably 75% or more; more preferably 90% or more. Preferred acrylic polymers have polymerized units of one or more alkyl acrylate. Preferred acrylic polymers have polymerized units one or more vinyl monomer that has one or more pendant carboxyl group; more preferably polymerized units of acrylic acid, methacrylic acid, itaconic acid, or a mixture thereof. Among acrylic polymers, the preferred amount of polymerized units of monomer having one or more pendant carboxyl group is, by weight based on the dry weight of the polymer, 10% or less; more preferably 7% or less. Among acrylic polymers, the preferred amount of polymerized units of monomer having one or more pendant carboxyl group is, by weight based on the dry weight of the polymer, 1% or more; more preferably 2% or more.

Preferably, the binder polymer is present in the aqueous composition in the form of latex particles. The volume-average diameter of the collection of all the polymer particles in the aqueous composition is 200 nm or smaller. Preferably, the volume-average diameter of the collection of all of the binder polymer particles in the aqueous composition is 10 nm or larger; more preferably 50 nm or larger. Preferably, the volume-average diameter of the collection of all of the binder polymer particles in the aqueous composition is 150 nm or smaller; more preferably 120 nm or smaller; more preferably 100 nm or smaller. Latex particle size is preferably measured by laser diffraction.

Preferably, the amount of binder polymer, by dry weight based on the solid weight of the binder combination, is 63% or more; more preferably 70% or more. Preferably, the amount of binder polymer, by dry weight based on the solid weight of the binder combination, is 98% or less; more preferably 85% or less; more preferably 78% or less.

Preferably, one or more PVA is used that has degree of saponification of 75% or more; more preferably 80% or more; more preferably 85% or more. Preferably, one or more PVA is used that has degree of saponification of 95% or less; more preferably 90% or less.

Preferably, one or more PVA is used that has viscosity of 0.5 mPa*s or higher; more preferably 1 mPa*s or higher; more preferably 2 mPa*s or higher. Preferably, one or more PVA is used that has viscosity of 5 mPa*s or lower; more preferably 4 mPa*s or lower; more preferably 3 mPa*s or lower.

Preferably, one or more PVA is used that is a carboxylated PVA or a sulfonated PVA or a PVA that is both carboxylated and sulfonated, or a mixture thereof. More preferably, one or more PVA is used that is a sulfonated PVA. Preferably, one or more PVA is used that has solubility in water at 25° C. of 20 grams or more PVA in 80 grams of water.

Preferably, the amount of PVA is, by dry weight based on the solid weight of the binder combination, 5% or more; more preferably 10% or more; more preferably 15% or more. Preferably, the amount of PVA is, by dry weight based on the solid weight of the binder combination, 25% or less; more preferably 21% or less; more preferably 18% or less.

Preferred water-soluble cellulose derivatives are hydroxyalkyl celluloses, hydroxyalkyl methylcelluloses, and carboxyalkyl celluloses. Among hydroxyalkyl celluloses, preferred is hydroxyethyl cellulose. Among hydroxyalkyl methylcelluloses, preferred is hydroxypropyl methylcellulose. Among carboxyalkyl celluloses, preferred is carboxymethyl cellulose. Most preferred is carboxymethyl cellulose (CMC).

When CMC is used, preferably the CMC is in the form of its sodium salt Among CMCs, preferred are those that have a degree of substitution of from 0.20 to 0.96, more preferably from 0.40 to 0.96, and more preferably from 0.65 to 0.96.

Preferably the viscosity of the water-soluble cellulose derivative, measured in a 1% solution by weight, is 1,000 mPa*s or greater; more preferably 2,000 mPa*s or greater. Preferably the viscosity of the water-soluble cellulose derivative, measured in a 1% solution by weight, is 10,000 mPa*s or less; more preferably 5,000 mPa*s or less.

Preferably, the amount of water-soluble cellulose derivatives, by dry weight based on the solid weight of the binder combination, is 1% or more; more preferably 2% or more; more preferably 4% or more. Preferably, the amount of water-soluble cellulose derivatives, by dry weight based on the solid weight of the binder combination, is 12% or less; more preferably 11% or less; more preferably 10% or less;

A preferred use for the composition of the present invention is making an electrode, preferably a cathode, for a lithium ion battery. In a preferred method, an aqueous slurry is used, where that aqueous slurry contains the binder combination, one or more cathode compounds that contain lithium, and one or more conductive material. Preferably, a layer of the slurry is applied to a substrate, and the water is removed by allowing the water to evaporate, either at ambient conditions or by applying heat or reduced pressure or moving air or a combination thereof.

Preferably, the aqueous slurry is prepared by first making an aqueous composition (herein called the "binder preparation") that contains the binder combination and, optionally, one or more additives, but does not contain conductive material or cathode compound. Preferred additives are defoaming agents, leveling agents, stabilizing agents (such as surfactants), and mixtures thereof. Preferably, when additives are present, the total amount of additives, by solids weight based on the total solids weight of the binder preparation, is 20% or less; more preferably 10% or less.

Preferred conductive materials are carbon black, graphite, and mixtures thereof. Preferably, the conductive material is present as particles. Preferably, the conductive material contains carbon black. Preferably, the conductive material has number-average particle size (assessed by images of the particles using transmission electron microscopy) of 10 nm or larger; more preferably 20 nm or larger; more preferably 30 nm or larger. Preferably, the conductive material has number-average particle size of 1,000 nm or smaller; more preferably 300 nm or smaller; more preferably 100 nm or smaller.

When the electrode is an anode, the slurry contains one or more anode compound. Anode compounds are preferably forms of carbon, or elements that are capable of forming alloys with lithium, or complexes or compounds containing such elements, or mixtures thereof. More preferred anode compounds are natural graphite, artificial graphite, coke, carbon fiber, an element that is capable of forming an alloy with lithium, complexes or compounds containing such elements, or mixtures thereof. Among elements capable of forming an alloy with lithium, preferred are Al, Si, Sn, Ag, Bi, Mg, Zn, In, Ge, Pb, and Ti. More preferred anode compounds contain natural or artificial graphite or a mixture thereof. Preferably, anode compound is in the form of particles. Preferred weight average particle size is 10 nm to 10 micrometer. In some embodiments, one or more anode compound is present that also functions as a conductive material. In some embodiments, one or more anode compound is present that does not function as a conductive material. In some embodiments, one or more anode compound is present that also functions as a conductive material, and one or more anode compound is present that does not function as a conductive material.

When the electrode is a cathode, the slurry contains one or more cathode compounds that contain lithium. Preferred cathode compounds that contain lithium are oxide or phosphate compounds that contain both lithium and one or more additional metals. Preferred additional metals are cobalt, manganese, nickel, iron, and mixtures thereof. The oxide or phosphate compound may be a co-crystalline compound with an oxide of a metal other than lithium. Preferred cathode compounds that contain lithium are $LiCoO_2$, $LiMn_xO_{2x}$, $LiNi_{(1-x)}Mn_xO_{2x}$ (where x is 1 or 2), $LiMn_2O_4$, $LiNiO_2$, $LiFeO_2$, and $LiFePO_4$, $LiFePO_4 \cdot zM'O$ (where M'O is a metal oxide, and where z is 0.01 to 1.1) and mixtures thereof. Suitable metal oxides for M'O are $V_2O_3$, $TiO_2$, $Cr_2O_3$, $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$, and mixtures thereof. The cathode compound is optionally doped with one or more cations, for example cations of one or more of aluminum, niobium, and zirconium.

Preferably, the cathode compound is present as particles. Preferably, the weight-average particle diameter is 10 nm to 10 micrometer.

When an aqueous slurry is made, preferably the amount of binder preparation, by solid weight of binder preparation based on the solid weight of the slurry, is 1% or more; or 2% or more; or 3% or more. When an aqueous slurry is made, preferably the amount of binder preparation, by solid weight of binder preparation based on the solid weight of the slurry, is 10% or less; more preferably 7% or less; more preferably 5% or less.

When an aqueous slurry is made, preferably the amount of conductive material, by solid weight of conductive material, based on the solid weight of the slurry, is 1% or more; or 2% or more; or 4% or more. When an aqueous slurry is made, preferably the amount of conductive material, by solid weight of conductive material, based on the solid weight of the slurry, is 10% or less; more preferably 8% or less; more preferably 6% or less.

When an aqueous slurry is made, preferably the amount of cathode compounds, by solid weight of cathode compounds, based on the solid weight of the slurry, is 80% or more; or 85% or more; or 90% or more. When an aqueous slurry is made, preferably the amount of cathode compounds, by solid weight of cathode compounds, based on the solid weight of the slurry, is 98% or less; more preferably 96% or less; more preferably 94% or less.

The aqueous slurry may be used for making an electrode that is appropriate for use in a lithium ion battery. Preferably, a layer of the slurry is applied to substrate that is a current collector such as metal foil, and the layer of slurry is dried. The layered article made from the dried layer of slurry on the substrate is preferably pressed under high pressure, preferably by passing through a roller having a load of from 100 metric tons to 200 metric tons. Also contemplated are embodiments in which a layer of slurry is applied to a temporary substrate and dried, and then the layer of dried slurry is transferred to a substrate that is a current collector.

When the electrode is a cathode, the current collector is preferably aluminum foil. When the electrode is an anode, the current collector is preferably copper foil.

It is desirable for the layer of dried slurry to be flexible. When a layered article is pressed in a roller, the layered article will normally tend to curl after it is released from the roller. Preferably, when this curling takes place, the dried layer of slurry will not crack and will not exhibit any areas that become detached from the foil.

Also, it is desirable that the dried layer of slurry shows acceptable electrochemical performance. Preferably, the dried layer of slurry has acceptable discharge capacity, has coulombic efficiency, and maintains discharge capacity after many charge/discharge cycles.

The following are examples of the present invention.

The following materials were used in the following examples:

| Function | Composition | Supplier |
|---|---|---|
| Cathode material | LFP, LFP-NCO | Aleees |
| Conductive | Super P ™ Li carbon black | TIMCAL |
| PVA | PVA 1799 | Shanghai Kaidu Industrial Development Co., Ltd. |
| De-foaming agent | GP330 | Jiangsu haian petrochemical plant |
| Leveling agent | Tego ™ Dispers 750W additive | Evonik Industries AG |
| Stabilization agent | Tergitol ™ 15-s-40 surfactant | Dow Chemical Co. |

Further materials were as follows:

| Function | Composition | Supplier |
|---|---|---|
| Separator | Celgard ™ 2400 | Celgard |
| Electrolyte | 1M $LiPF_6$ in ethylene carbonate (EC): dimethyl carbonate (DMC) (1:1 in weight) | Guotai-Huarong New Chemical Material Co., Ltd |
| Solvent | NMP, 99.5% | Alfa Aesar |
| Current collector | Al foil, 25 μm thickness | Shenzhen Fulaishun |
| Counter and reference electrode | Li foil, Φ15*1 mm | China Energy Lithium Co., Ltd |
| Cell type | 2016 coin cell | Shanghai Anlu Material Supplier |

The binders used in the following examples were as follows:

Latex #1: Latex polymer. Volume-average particle size of between 55 and 85 nm Composition is polymerized units of ethyl acrylate with 2 to 7% by weight of polymerized units of an unsaturated carboxyl-functional monomer.

Latex #C2: Latex polymer. Composition is polymerized units, by weight, as follows: ethyl acrylate (40-50%), 2-ethylhexyl acrylate (40-50%), styrene (greater than 0% and less than or equal to 10%), unsaturated carboxyl-functional monomer (greater than 0% and less than or equal to 5%), and multiethylenically unsaturated monomer (greater than 0% and less than or equal to 2%). Volume-average particle diameter of between 800 and 1,000 nm "PVCF": Comparative binder. Poly(vinylidene fluoride) polymer in solution in NMP solvent, Kynar™ HSV900, from Arkema.

Latex #C3: Comparative binder. LA132™ aqueous binder, polymer particles in water, volume-average particle size of 2.78 micrometer (µm), from Chengdu Indigo power sources Co., Ltd. Latex #C3 is a commercial product used as a binder for lithium ion electrodes.

PU#1: Aliphatic urethane polymer, present as a dispersion of polymer latex particles, volumer-average particle diameter of 43 nanometers.

Further materials used were as follows:

CMC#1: CMC having viscosity above 2,000 mPa*s and less than 5000 mPa*s based on 1% by mass aqueous solution CMC#2: CMC having viscosity of 2,000 mPa*s based on 2% by mass aqueous solution CMC#3: CMC having viscosity of 1500 mPa*s based on 0.5% by mass aqueous solution S-PVA: sulfonated polyvinyl alcohol: degree of saponification greater than 80 mol % and less than 95 mol %; viscosity greater than 1.5 mPa*s and less than 3.5 mPa*s Latex particle sizes were measured using laser diffraction with a Coulter LS230 Laser Diffraction Particle Size Analyzer (Beckman Coulter, Inc.).

Binder preparation BP-1 was made as follows:

2.09 g of Latex #1 aqueous emulsion (solid content 35 mass %); was diluted with 1.25 g of deionized water. Then 2.45 g of the CMC aqueous solution (CMC #1, 2.0 mass %) and 0.92 g of the PVA aqueous solution (SPVA, 20.0 mass %) were added into it. In addition, 0.02 g of de-foaming agent GP330, 0.16 g leveling agent 750 W (10.0 mass %), and 0.04 g stabilization agent 40-s-15 were added into the dispersion. The milk-like aqueous dispersion was prepared after stirring the system at 500 rpm for 30 min. The binder preparation had a solid content of 15%.

Slurry S-1 was made as follows:

6.93 g of aqueous binder preparation BP-1 was diluted with 18.11 g of deionized water. Then 1.30 g of Super-Li was mixed into the solution and got complete wetting dispersion by using high speed mixer and mixing at 3000 rpm for 3 min After that, 23.66 g of LFP powder was added into the system and got complete wetting and dispersion by mixing at 3000 rpm for 3 min Finally the well dispersed cathode slurry was achieved.

Cathode C-1 was made as follows:

The slurry S-1 was cast onto the aluminum foil on an Elcometer™ 4340 Automatic Film Applicator with vacuum and leveling adjustment. Then the wet cast electrode sheet was then dried at 50° C. for 10 min followed by 80° C. for 8 hours. Two sheets were prepared by controlling area density. One thick sheet was prepared with an area density (dry weight of slurry per unit area) of 160 g/m² for processing property study, and another thin sheet was prepared with an area density of around 60 g/m². The as-prepared thin electrode sheet was pressed between rollers under load of 100 tons.

Comparative Slurry S-C1 was made as follows:

16.00 g of NMP solution of PVDF (solid content 5 mass %) was diluted with 14.80 g NMP. Then 1.00 g of Super-Li was mixed into the solution and got complete wetting dispersion by using high speed mixer and mixing at 3000 rpm for 3 min. After that, 18.20 g of LFP powder was added into the system and got complete wetting and dispersion by mixing at 3000 rpm for 3 min Finally the well dispersed cathode slurry was achieved.

Comparative Cathode C-C1 was made as follows:

The slurry S-C1 was cast onto the aluminum foil on an Elcometer™ 4340 Automatic Film Applicator with vacuum. Then the wet cast sheet was dried at 80° C. for 30 min followed by 120° C. for 30 min Two sheets were prepared by controlling area density. One thick sheet was prepared with an area density of 160 g/m² for processing property study, and another thin sheet was prepared with an area density of around 60 g/m². The as-prepared thin electrode sheet was rolled under a load of 100 tons.

Comparative Slurry S-C2 was made as follows 5.33 g of LA132 aqueous dispersion (solid content 15 mass %) was diluted with 25.47 g deionized water. Then 1.00 g of Super-Li was mixed into the solution and got complete wetting dispersion by using high speed mixer and mixing at 3000 rpm for 3 min After that, 18.20 g of LFP powder was added into the system and got complete wetting and dispersion by mixing at 3000 rpm for 3 min. Finally the well dispersed cathode slurry was achieved.

Comparative Cathode C-C2 was made as follows:

The slurry S-C2 was cast onto the aluminum foil and rolled using the same methods as used for Cathode C-1.

Mechanical Property Testing:

After passing through the rollers, each cathode curled. Each cathode was inspected to look for cracking, areas in which dried slurry detached from the substrate, and powder dropping. Powder dropping, is a phenomenon in which the coated powders peel off the aluminum foil substrate during transferring of the cathode in the production process of making cells.

Results of Property Testing:

| Cathode | Binder | Result |
| --- | --- | --- |
| Example C-1 | Example BP-1 | Unbroken layer; no cracks, no separated portions |
| Comparative C-C1 | PVDF in solvent | Unbroken layer; no cracks, no separated portions |
| Comparative C-C2 | LA-132 | cracks and separated portions |

The Inventive Example C-1 shows excellent performance. The Comparative Example C-C1 also shows good performance but uses a solvent-based binder and not an aqueous binder preparation. Comparative Example C-C2 uses an aqueous binder that does not have water-soluble cellulose derivative or PVA, and its performance is poor.

The electrochemical performance of the cathodes was evaluated in batteries as follows.

After overnight night drying (16 hours) under 120° C. in vacuum oven, the electrode sheets were assembled in 2016 coin cells using Celgard™ 2400 separator and lithium foils as the counter and reference electrodes. A solution of 1 M LiPF6 in ethylene carbonate (EC): dimethyl carbonate (DMC) (1:1 in weight, Zhangjiagang Guotai-Huarong New Chemical Material Co., Ltd) was employed as the electrolyte. The assembly of cells was processed in an argon filled glove box with oxygen and water contents less than 1 ppm. The galvanostatic charge/discharge tests were conducted on a LAND™ CT2001A battery test system in a voltage range of 2.0-3.85 V (versus Li/Li+) at 0.05 C~1 C-rate under 23° C. The testing procedures are specified below.

| Cycles | Protocols | | End conditions |
|---|---|---|---|
| first 2 | Charge | Constant current @ 0.05 C | Till voltage up to 3.85 V |
| | | Constant voltage @ 3.85 V | Till current down to 0.01 C |
| | Discharge | Constant current @ 0.05 C | Till voltage down to 2.0 V |
| third | Charge | Constant current @ 0.05 C | Till voltage up to 3.85 V |
| | | Constant voltage @ 3.85 V | Till current down to 0.01 C |
| | Discharge | Constant current @ 0.1 C | Till voltage down to 2.0 V |
| fourth | Charge | Constant current @ 0.5 C | Till voltage up to 3.85 V |
| | | Constant voltage @ 3.85 V | Till current down to 0.05 C |
| | Discharge | Constant current @ 0.5 C | Till voltage down to 2.0 V |
| fifth | Charge | Constant current @ 0.5 C | Till voltage up to 3.85 V |
| and | | Constant voltage @ 3.85 V | Till current down to 0.05 C |
| following | Discharge | Constant current @ 1 C | Till voltage down to 2.0 V |

Results: Capacity and First Coulombic Efficiency

| Cathode | Binder | 0.05 C-$1^{st(2)}$ | 0.1 C-$1^{st(2)}$ | 0.5 C-$1^{st(2)}$ | 1 C-$1^{st(2)}$ | Highest capacity @ 1 C |
|---|---|---|---|---|---|---|
| Example C-1 | Example BP-1 | 161 | 160 | 142 | 142 | 146 |
| C-C1[1] | PVDF in solvent | 162 | 159 | 136 | 137 | 141 |
| C-C2[1] | LA-132 | 160 | 158 | 139 | 139 | 144 |

Note
[1] Comparative
Note
[2] Unit is (mAh/g)

The example cathode C-1 performs as well as the cathode made with the solvent-based PVDF and as the cathode made with the commercial latex binder Indigo™ LA-132.

Electrochemical cycling test was performed as follows. Charge/discharge in IC-rate for 100 times as one cycling test. We tested Example C-1 8 times; we tested Comparative Example C-2 8 times; and we tested 4 times to Comparative Example C-1 4 times. Each test was run for 100 cycles. The results were as follows.

| Cathode | Binder | 1 C-1st (mAh/g) | 1 C-cycle 100th (mAh/g) | Capacity retention |
|---|---|---|---|---|
| Example C-1 | Example BP-1 | 142 | 143 | 101% |
| Comparative C-C1 | PVDF in solvent | 137 | 137 | 100% |
| Comparative C-C2 | LA-132 | 139 | 140 | 101% |

The Example cathode performed as well as the Comparative cathodes, which were made with commercial binder systems.

In summary, the binder preparation of Example BP-1 shows comparable electrochemical performance to commercial binders, and the binder preparation of Example BP-1 shows mechanical property superior to the commercial waterborne binder.

A variety of cathodes ("series 2") were made using the same methods employed in making Example binder preparation BP-1, Example slurry S-1, and Example cathode C-1. Cathodes were tested by rolling as described above. The compositions of the binder preparations and the results of mechanical testing were as follows. All binder preparations had total solids of 15%.

| Ex. | Binder | Binder wt %[1] | PVA | PVA wt %[1] | CMC wt %[2] | 750W wt %[3] | Cathode property |
|---|---|---|---|---|---|---|---|
| 2-1[4] | Latex#1 | 70.4 | S-PVA | 17.6 | 4.7 | 1.6 | Good |
| 2-2 | Latex#1 | 77.0 | S-PVA | 18.0 | 5.0 | 0.0 | Good |
| 2-3 | Latex#1 | 75.5 | S-PVA | 18.0 | 5.0 | 1.5 | Good |
| 2-C4 | Latex#1 | 100.0 | S-PVA | 0.0 | 0.0 | 0.0 | Cracking, powder dropping |
| 2-C5 | Latex#1 | 0.0 | S-PVA | 100.0 | 0.0 | 0.0 | Cracking, powder dropping |
| 2-C6 | Latex#1 | 0.0 | S-PVA | 0.0 | 100.0 | 0.0 | Viscosity too high for use |
| 2-C7 | Latex#1 | 80.5 | S-PVA | 18.0 | 0.0 | 1.5 | Cracking, powder dropping |
| 2-C8 | Latex#1 | 93.5 | S-PVA | 0.0 | 5.0 | 1.5 | Cracking, powder dropping |

[1] solid weight, based on total solid weight of binder preparation
[2] CMC#1, solid weight, based on total solid weight of binder preparation
[3] 750W, solid weight, based on total solid weight of binder preparation
[4] Also contains 4.1% Tergitol™ 15-s-40 surfactant, and 1.6% defoamer GP-330, by solid weight, based on total solid weight of binder preparation Further samples in series 2 were as follows:

| Ex. | Binder | Binder wt %[1] | PVA | PVA wt %[1] | CMC wt %[2] | 750W wt %[3] | Cathode property |
|---|---|---|---|---|---|---|---|
| 2-9 | Latex#1 | 70.5 | S-PVA | 18.0 | 10.0 | 1.5 | Good |
| 2-10 | Latex#1 | 65.5 | S-PVA | 18.0 | 15.0 | 1.5 | Viscosity too high for use |
| 2-11 | Latex#1 | 83.5 | S-PVA | 10.0 | 5.0 | 1.5 | OK |

-continued

| Ex. | Binder | Binder wt %[1] | PVA | PVA wt %[1] | CMC wt %[2] | 750W wt %[3] | Cathode property |
|---|---|---|---|---|---|---|---|
| 2-12 | Latex#1 | 63.5 | S-PVA | 30.0 | 5.0 | 1.5 | Cracking, powder dropping |
| 2-13 | Latex#1 | 43.5 | S-PVA | 50.0 | 5.0 | 1.5 | Cracking, powder dropping |
| 2-C14 | Latex#C2 | 75.5 | S-PVA | 18.0 | 5.0 | 1.5 | Cracking, powder dropping |
| 2-15 | Latex#1 | 75.5 | PVA 1799 | 18.0 | 5.0 | 1.5 | Cracking, powder dropping |
| 2-16 | PU | 75.5 | S-PVA | 18.0 | 5.0 | 1.5 | Good |

[1]solid weight, based on total solid weight of binder preparation
[2]CMC#1, solid weight, based on total solid weight of binder preparation
[3]750W, solid weight, based on total solid weight of binder preparation Further examples in series 2 were as follows:

| Ex. | Binder wt %[1] | PVA wt %[2] | CMC | CMC wt %[3] | 750W wt %[4] | Cathode property |
|---|---|---|---|---|---|---|
| 2-17 | 75.5 | 18.0 | CMC#2 | 5.0 | 1.5 | Cracking, powder dropping |
| 2-18 | 75.5 | 18.0 | CMC#3 | 5.0 | 1.5 | Cracking, powder dropping |

[1]Latex#1, solid weight, based on total solid weight of binder preparation
[2]S-PVA, solid weight, based on total solid weight of binder preparation
[3]solid weight, based on the total solid weight of binder preparation
[4]750W, solid weight, based on total solid weight of binder preparation Comparative Examples 2-C4, 2-C5, 2-C6, 2-C7, and 2-C8 each lack one or more of the required ingredients for the present invention, and each one shows unacceptable behavior. Among the examples of the present invention, the following trends were observed. Example 2-10 has relatively high level of CMC and shows undesirably high viscosity. Examples 2-12 and 2-13 have relatively high level of PVA and show undesirable lack of adhesion to the aluminum foil when rolled. Comparative Example 2-C14 uses an acrylic latex with a relatively large particle size, and it shows an undesirable lack of adhesion to the aluminum foil when rolled. Example 2-15 uses non-sulfonated PVA, and it shows an undesirable lack of adhesion to the aluminum foil when rolled. Examples 2-16 and 2-17 use CMC of relatively low and relatively high viscosity, and these two examples show an undesirable lack of adhesion to the aluminum foil when rolled.

The invention claimed is:

1. An aqueous composition for making lithium ion battery electrodes, said aqueous composition comprising
   (a) 63% or more by dry weight, based on the total weight of (a), (b), and (c), of one or more binder polymers in the form of latex particles, wherein the latex particles have a volume-average diameter of 200 nm or smaller,
   (b) one or more polyvinyl alcohols that are carboxylated or sulfonated or both, in an amount from 5% to 25% by weight based on the total weight of (a), (b), and (c), and
   (c) one or more water-soluble cellulose derivatives that have a viscosity of 1,000 to 10,000 mPa*s in a 1% by weight solution at 25° C., in an amount from 1% to 12% by weight based on the total weight of (a), (b), and (c).

2. The composition of claim 1, said composition additionally comprising one or more cathode compounds that comprise lithium.

3. The composition of claim 1, wherein said polyvinyl alcohol comprises sulfonated polyvinyl alcohol.

4. The composition of claim 1, wherein said water-soluble cellulose derivative comprises sodium carboxymethyl cellulose.

5. The composition of claim 1, wherein said binder polymer comprises one or more acrylic polymer.

6. A method of making an electrode suitable for use in a lithium ion battery, wherein said method comprises
   (i) providing an aqueous slurry comprising
      (a) 63% or more by dry weight, based on the total weight of (a), (b), and (c), of one or more binder polymers in the form of latex particles, wherein the latex particles have a volume-average diameter of 200 nm or smaller,
      (b) one or more polyvinyl alcohols that are carboxylated or sulfonated or both, in an amount from 5% to 25% by weight based on the total weight of (a), (b), and (c),
      (c) one or more water-soluble cellulose derivatives that have a viscosity from 1,000 to 10,000 mPa*s in a 1% by weight solution at 25° C. of, in an amount from 1% to 12% by weight based on the total weight of (a), (b), and (c), and
      (d) one or more conductive materials;
   (ii) forming a layer of said slurry on a metal substrate; and
   (iii) drying said layer of said slurry.

7. The method of claim 6, wherein said electrode is a cathode, and wherein said slurry additionally comprises
   (e) one or more cathode compounds that comprise lithium.

8. The method of claim 6, wherein said electrode is an anode, and wherein said slurry comprises one or more anode compounds, wherein each of said one or more anode compounds may be the same as one or more of said conductive materials or may be different from any of said conductive materials.

9. An electrode suitable for use in a lithium ion battery, wherein said electrode comprises
   (a) 63% or more by dry weight, based on the total weight of (a), (b), and (c), of one or more binder polymers,
   (b) one or more polyvinyl alcohols that are carboxylated or sulfonated or both, in an amount from 5% to 25% by weight based on the total weight of (a), (b), and,
   (c) one or more water-soluble cellulose derivatives that have a viscosity from 1,000 to 10,000 mPa*s in a 1% by weight solution at 25° C., in an amount from 1% to 12% by weight based on the total weight of (a), (b), and (c), and
   (d) one or more conductive material.

10. The electrode of claim 9, wherein said electrode is a cathode, and wherein said electrode additionally comprises (e) one or more cathode compounds that comprise lithium.

11. The electrode of claim 9, wherein said electrode is an anode, and wherein said electrode comprises one or more anode compounds, wherein each of said one or more anode compounds may be the same as one or more of said conductive materials or may be different from any of said conductive materials.

* * * * *